United States Patent [19]
Lapointe et al.

[11] Patent Number: 5,606,615
[45] Date of Patent: Feb. 25, 1997

[54] COMPUTER SECURITY SYSTEM

[76] Inventors: Brian K. Lapointe, 53 Jerdens La., Rockport, Mass. 01966; James A. Lapointe, 43 Ledgewood Dr., Danvers, Mass. 01923

[21] Appl. No.: 442,302

[22] Filed: May 16, 1995

[51] Int. Cl.$^6$ ................................................. H04L 9/00
[52] U.S. Cl. ................................................. 380/25; 380/4
[58] Field of Search .................... 380/4, 25; 340/825.31, 340/825.34

[56] References Cited

U.S. PATENT DOCUMENTS

| | | | |
|---|---|---|---|
| 4,016,405 | 4/1977 | McCone et al. | 340/825.34 |
| 4,433,207 | 2/1984 | Best | 380/4 |
| 4,465,901 | 8/1984 | Best | 380/4 |
| 4,812,841 | 3/1989 | Chen | 340/825.31 |
| 4,942,606 | 7/1990 | Kaiser et al. | 380/4 |
| 4,970,504 | 11/1990 | Chen | 340/825.31 |
| 5,058,164 | 10/1991 | Elmer et al. | 380/4 |
| 5,097,506 | 3/1992 | Kaiser et al. | 380/25 |
| 5,173,940 | 12/1992 | Lantz et al. | 380/25 |
| 5,475,839 | 12/1995 | Watson et al. | 380/4 |
| 5,537,544 | 7/1996 | Morisawa et al. | 380/25 |

*Primary Examiner*—Salvatore Cangialosi
*Attorney, Agent, or Firm*—Cesari and McKenna

[57] ABSTRACT

An improved computer security system including a portable, electronic Key, an Access Device with Touch Pad, a Lock, a Lock Server and Server Device, and a Master Device. The Access Device provides a means to validate the user to the Key. The Lock is physically located with, and connected to the host computer. Improved security is achieved through the use of "throw-away" passwords, which are generated in a random fashion by the Lock Server, and then loaded directly into volatile memory of Keys, but transferred to a Master Device for loading into volatile memory of Locks. These throw-away passwords are used in a process of cross validation between the Lock and Key, a requirement before access to the host computer is granted. A user specific "touch-print" provides a more secure and more user friendly way of preventing the use of Keys by unauthorized persons. Sensors, e.g., photosensors, within the Key, Lock and Master Device guard against physical attacks.

Additional security is obtained by locating the Lock external to the host computer, thereby preventing an unauthorized user from defeating the host computer operating system security.

2 Claims, 5 Drawing Sheets

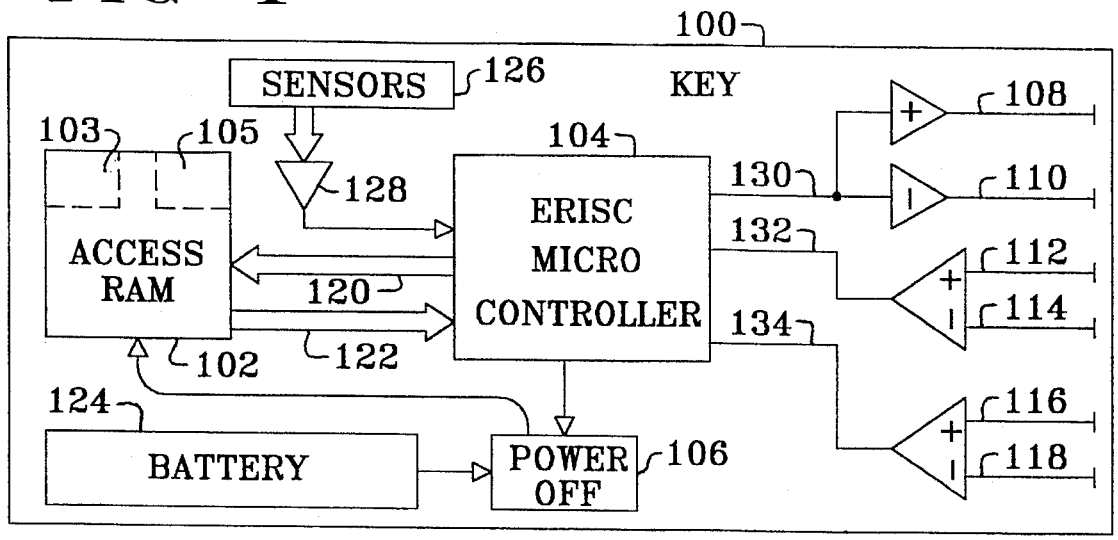
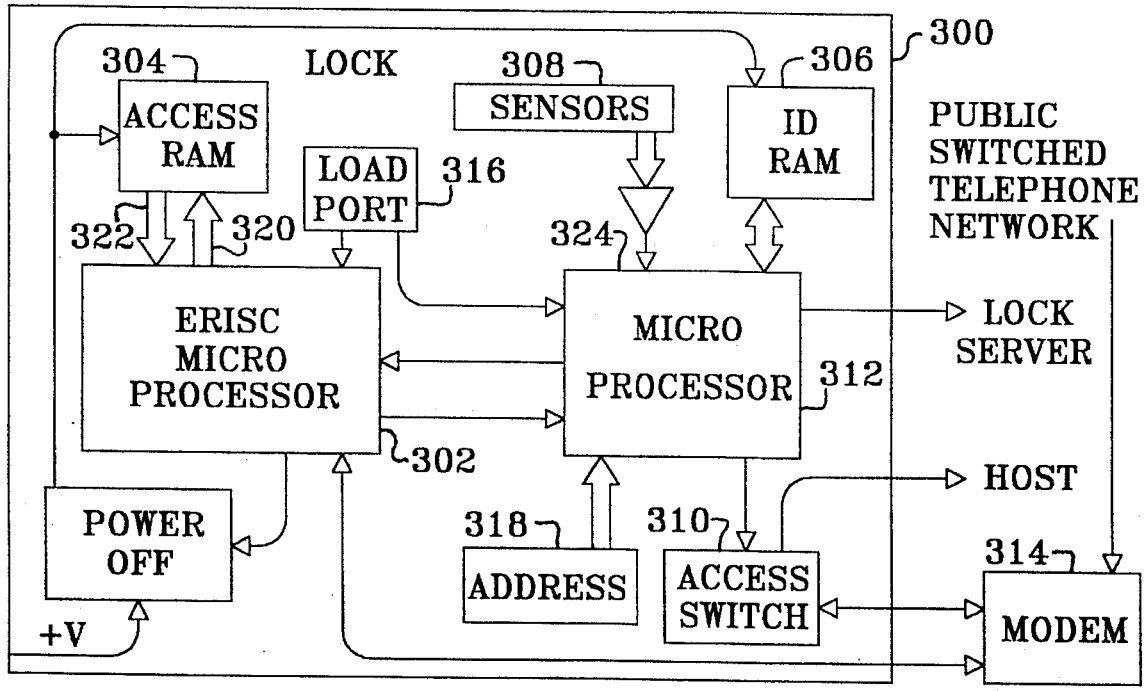
FIG 1

COMPUTER SECURITY SYSTEM

FIELD OF THE INVENTION

This invention relates to a security system designed to prevent unauthorized access to a computer or computer network and more particularly to control remote access over public telephone lines or cellular networks. Facility access control is also disclosed.

PRIOR ART

Increasing dependence on computers to store and convey highly confidential data, has given birth to the need for reliable security measures. Attempts by various corporations, to provide ample security, have been consistently thwarted by clever individuals, who live for the challenge of beating the system. Witness the number of "Hackers", who succeed daily on gaining access into government and industry computer systems, not only for the thrill, but to create a little mischief, by planting a virus or even stealing and manipulating valuable confidential information.

Computers connected by a LAN and located within a physically secure environment, are today still at risk of unauthorized access. Because of the cost and impracticality of updating computer systems, to keep in step with the latest technology, an immediate need exists for the corporation or small business man, to be able to add an effective security device to an existing system, for little cost. An even greater need exists, to secure access from unauthorized persons seeking entry to a computer system, from a remote location, by a WAN or using a modem. It is all too easy and quite inexpensive, to acquire monitoring equipment for the purpose of tapping into telephone lines to record a confidential password, that can be reused at a later date to gain access.

In one particular security system, disclosed in U.S. Pat. No. 5,120,939, an attempt to address this problem is made but it is still inadequate. The use of a smart card to store confidential access data, that is not transmitted over public networks, does not prevent a thief from acquiring and dismantling a card. Valuable information can be down loaded from the Smart Card's EEPROM memory chip and reused. Meanwhile, the unsuspecting authorized user on a weekend vacation, may not realize the loss in time to prevent a serious security breach. Even if access is not the primary motive, an enormous problem still presents itself. Since the loss of a single card is typically handled by invalidating it within the system, the hundreds or thousands of Smart Cards still in use are allowed to remain in service. It is exceedingly difficult to detect if a security breach has occurred and the total cost of such losses is immeasurable.

In more recent schools of thought, the security solution takes on a software approach known as "fire walls": see Byte magazine April 1995, "Firewalls for Sale". Here, an attempt to identify individuals as friend or foe involves a complex process of monitoring. This strategy assumes that authorized users and hackers behave in very different ways once inside the system. An attempt to trap an intruder seeks to confine the individual to areas of no consequence. The cost of such security systems ranges from about $20,000 to $30,000, for the good ones, putting them out of reach for small business and even some corporations. And how long do we believe that our investment will pay off? History has proven time and again that the hacker is a rapid and efficient learner, interacting with others to share what he has learned. And what then do we do, when the intruder becomes educated enough to enter through the front door? A system often visited by undetected intruders does appear to be a very secure system indeed.

Another approach to access security, requires authorized users to remember passwords of 6 or more characters, changing them every 30 days to ensure high security ("Spoof Proof Security", Richard Power, p. 123, LAN Magazine, March 1995). In companies utilizing large numbers of computers, such as American Express, the burden on some employees to remember more than 50 passwords is absurd. "An over abundance of passwords and IDs causes administrative problems as well . . . people are generally unable or unwilling to remember a legion of passwords and user IDs. They resort to writing them down, posing a hefty security risk." ("Under Lock and Key", Mike Hurwicz, p. 116, LAN Magazine March 1995). Aside from these problems just noted, a greater dilemma is the designated employee password itself, since the risk of one being recovered and reused by unauthorized individuals is too great.

In an age of plastic money and remote controlled war machines, the lack of adequate security to safeguard computer systems could be devastating. So long as computer security information, of any kind, continues to be reusable, the danger of unauthorized persons acquiring such information, and using it, will present a serious security dilemma.

A. Objects of the Invention

Accordingly, it is an object of the invention to provide an improved computer security system.

Further, it is an object of the invention to provide and improved computer security system which guards against lost, stolen or compromised access facilities.

B. Brief Description of the Invention

A security system includes a portable electronic, Key, which is user specific. At the time of issue, a Key is loaded by a Lock Server with secret security data, the same as that which is loaded into each of the Locks that a Key is authorized to access. The Lock is physically located with and connected to the host computer. Additional security is achieved by locating the Lock external to the host, thereby preventing an unauthorized intruder from defeating the host computer operating system security.

A request for access begins by first inserting the key into an Access Device. A Touch Pad on top of the Access Device provides the means by which the authorized user enters a pattern that is specific to, and stored within, the Key, thus validating the Key to the user and the user to the Key. Upon receipt and verification of the valid touch-print, the Key switches to a communicative state and transmits its ID to the Access Device which in turn transmits it to the user's communication terminal (e.g., the user's personal computer); the latter then calls the host computer Lock to gain access. Upon answering, the Lock requests a session block address from the Lock Server, and sends the address with the corresponding Lock password to the Key, where it must be matched exactly to the same password stored at the same address within the Key memory. Having successfully verified the Lock in this manner, the Key retrieves the next sequential password from memory. This password, which is the Key password for this session, is sent to the Lock. The Lock, upon receiving the Key password, compares it to the same password stored in the Lock memory, to obtain verification of the Key. With the Key and the Lock having validated each other in this manner, access is granted, and the Key returns to its noncommunicative state; a mode in which the only function that the Key will perform is listening for touch-print entries.

A Lock Server, a dedicated PC operating applications software with accompanying Server Device, is implemented with the Lock or lock system, to poll all Locks in the network and control the random assignment of session block addresses as needed. Individual Locks are checked during the polling process to identify any malfunction, tampering, or theft which may have occurred. Other security functions can be performed by the Lock Server, such as monitoring, and controlling and reporting on daily system activity. The Server Device is used to load all Keys, and provides the means to enter touch-print patterns into the Lock Server database.

A Master Device provides a portable means to load each of the Locks within the system. This feature insures that Locks are periodically inspected and eliminates the risk of sending valuable secret data over a vulnerable network of wiring.

The use of throw-away passwords provides the basis of the high security, offered by this invention. If what is once used may never again be reused, then recovered access information is of no value. Even if it were possible to obtain an unused password, without knowing the corresponding address, or when it can be used, the password is of no value.

By controlling access to information through the logical structure of its storage, it becomes virtually impossible for an attacker to read the memory of the Lock or Key. Further security against data theft is achieved through the use of Sensors, e.g., Photosensors, which trigger the erase of memory if the Key, Lock, or Master Device are dismantled.

Management of Key security is an extremely difficult task by nature of the environment to which Keys are constantly exposed. To address this concern, each Key has incorporated a number of additional functionality safeguards. An extremely restricted processor controlling Key function is governed by only two very limited programs of operation; one for a loading mode and one for an operating mode. Switching from operating mode to loading mode triggers the erase of Key memory, thereby preventing an attacker from loading instructions that could compromise security by altering Key operation. While in operating mode, the Key processor will only accept and respond to only a very limited number of commands at only very specific times. Such safeguards are intended to protect the Key against forced entry where fooling the processor into deviating from its programmed functionality could result in the loss of valuable passwords.

Incorporating a user specific touch-print, as a means of validating the user to the Key, is a significant improvement over security systems of the past. The touch-print is entered into the Access Device, using a blank faced Key Pad bearing no number or letter markings. Because the human brain functions by storing and recalling pictures in its memory, an individual can more easily remember and recall the pattern created by the touching of keys in a predetermined sequence (see "Mega Memory", Kevin Trudeau). Moreover, the personal touch-print is an arbitrary value, which is difficult to convey to others by accident or in casual conversation, where a password would be vulnerable. A nine key pad will produce several million different touch-print patterns.

The use of a Lock Server to monitor the lock system and control the assignment of session block addresses is a significant security advantage. A record of the time and date, Key ID, and Lock identity for each access is stored and reported by the Lock Server, as well as a separate accounting of all denied access attempts. Two sets of pseudo-random numbers are generated by the Lock Server, then combined to produce an unpredictable set of randomly addressed passwords. This is a very important security feature, since it creates a very extreme challenge for an attacker, who is monitoring a communication line, to predict a correct Key response to a valid Lock request. Even an attacker who has possession of the algorithms used in the number generation processes, would have great difficulty using old access information to predict a correct password at the correct address, or even to determine the partial or entire sequence of passwords, properly addressed. Two additional sets of pseudo-random numbers are generated by the Lock Server, and used to randomly assign session addresses, to destroy the logical sequence of password use.

The use of a Master Device as the sole means to load Locks, requires that only one piece of portable hardware be used under high physical security control while active.

The invention provides a means to add high security to existing computer systems, without requiring that the computers be state-of-the-art. Simplicity of design makes the invention not only more affordable, but also less prone to failure. Increased ease of implementation, portability, user friendliness, and freedom from worry over loss are also realized.

Further objects and advantages of the invention will become apparent, from a consideration of the drawings and the following detailed description of the invention in which:

FIG. 1 is a block and line diagram of a key and a lock in accordance with the present invention;

DETAILED DESCRIPTION OF THE INVENTION

Figure 3:
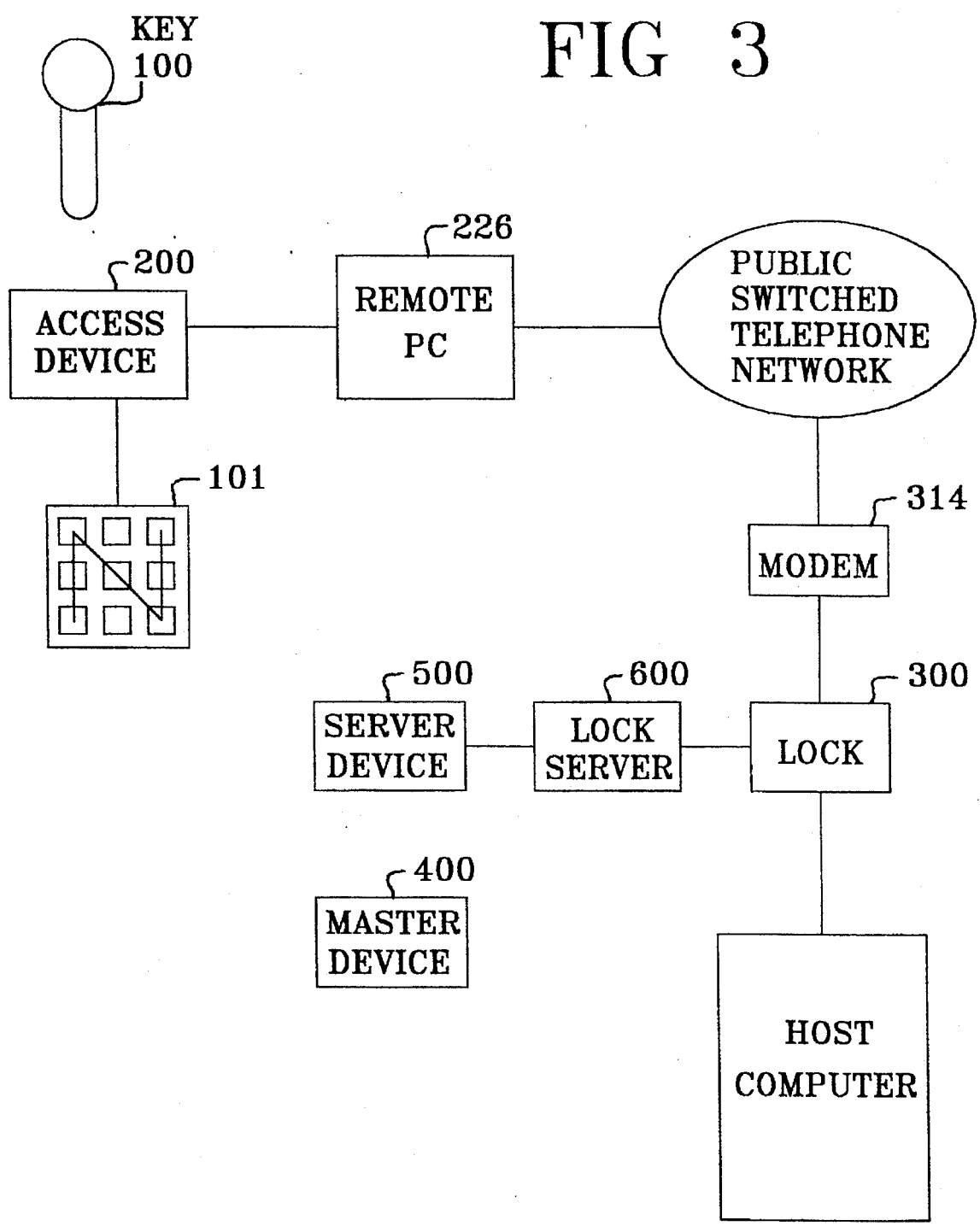
FIG. 3 is a block and line diagram showing the overall elements and operation of the system.

Referring to FIG. 1, as relating to a remote access application, there is disclosed a diagram of a Key 100 and a Lock 300; the latter is located at the site of a host computer to which access is to be sought (see FIG. 3). Key 100 and Lock 300 both contain a full set of passwords generated and randomly addressed by a Lock Server 600 (FIG. 3); they store these passwords in volatile RAMs 102 and 304 respectively. A battery 124 is used to maintain RAM 102 data. Stored in RAM 102 is the touch-print pattern 103 of the assigned user and any key function parameters, as well as a key ID number 105, which is recognized only by locks that a key is authorized to access. As described more fully below, an attempt by unauthorized persons to use Key 100 results in a command being issued to a Power Off Switch 106 to erase RAM 102. Two different situations result in the erasure of RAM 102. The first is a situation where an incorrect touch-print is entered, on the last of a preset number of tries. The second involves a situation where an invalidated Key 100 requests access to Lock 300, resulting in an erase command being sent to Key 100 in place of a session block address. A physical attack on Key 100 or Lock 300 results in erasure of RAMs 102, 304 and 306. RAM erasure is triggered by arrays of sensors 126 and 308, inside Key 100 and Lock 300 respectively, which are triggered on opening the key or lock.

Controllers 104 and 302 control Key 100 and Lock 300 operations, respectively, according to ROM programs stored within them. Preferably, these are Extremely Reduced Instruction Set Controllers (ERISCs), that is, they perform only those functions and programming instructions which are absolutely necessary for its intended application. However, it will be understood that the invention is not so limited and that controllers performing additional functions may be used, but are not preferred. The functions that Key 100 and Lock 300 must perform are few and simple. This limited functionality guards against an electronic attack on RAMs 102 and 304 by anyone trying to read data stored therein.

Key 100 senses that a session is to be attempted when ERISC 104 receives a Clock signal on line 134 from Access Device 200 (FIG. 2) when the key is inserted into the Access Device; ERISC 104 then resets to the start point of its operating program. The ERISC 104 program begins by sending a request for touch-print to Access Device 200 over a communication line 130. The touch-print is entered by the user on Touch Pad 101 (see FIG. 3) which is formed from rows and columns of unlabeled keys 103. The user enters a pattern of his/her own selection on these keys by touching the keys in the desired sequence. For example, the user may select a pattern comprising the letter "N". This pattern is entered by first touching the lower left key and then progressing upwardly, then diagonally to the right bottom key, then upwardly again as shown by the arrows on the key. Since individuals tend to remember patterns more readily than sequences of digits, they can easily remember the access code without writing it down, and this further improves the security of the system. The touch-print is received over a communication line Input 132 from Access Device 200, and ERISC 104 reads the touchprint for Key 100 from RAM 102, which begins at RAM 102 logical address 0. ERISC 104 compares the touch-print received from Access Device 200 to the touch-print read from RAM 102. If the two touchprints are equal, Key 100 switches to a communicative state. If the two touch-prints are not equal, and if two or more tries are allowed, as predetermined by security requirements, then ERISC 104 commands Access Device 200 to display a message to enter touch-print, and allows the user a total number of tries equal to the predetermined number as stored in RAM 102 (which is set into this RAM 102 at the time of loading the key), but not exceeding the limit of tries allowed by ERISC 104. (which is preferably set into ERISC 104's ROM at the time of manufacture). If the user fails to enter the correct touchprint, ERISC 104 commands a Power Off Switch 106 to remove power from RAM 102 so that all data stored therein is erased. Removal of Key 100 before reaching the predetermined number of touch-print entries allowed, does not allow for unlimited touch-print entry attempts, because a count of failed touch-print entries is stored in RAM 102 and only reset to 0 once the correct touch-print has been entered.

When Key 100 enters a communicative state, its ID is read by ERISC 104 from RAM 102 at a logical address that immediately follows the touch-print data. For example, the touch print data may begin at address 0000 and the key ID is stored immediately after this. ERISC 104 sends Key 100 ID over Output 130 for transmission to Lock 300 via e.g. the public telephone network (FIG. 3). Key 100 ID is received by ERISC 302 in lock 300, which is the single point of reception and transmission of data before access is granted. While the process of verification between Key 100 and Lock 300 is under way, ERISC 302 communicates with a Micro Processor 312. ERISC 302 sends the ID received from remote Key 100 to Processor 312 which searches for the ID in RAM 306 of the lock 300. If Processor 312 does not recognize Key 100 ID, Processor 312 responds with a message that Key 100 is not allowed to access Lock 300, and Lock 300 terminates the access attempt. If Key 100 ID is determined by Processor 312 to be stolen, lost, or expired, Processor 312 responds by sending a pre-determined bogus session address value, which ERISC 104 interprets as a command to erase RAM 102. ERISC 104 then commands Power Off Switch 106 to remove power from RAM 102 and erase all data in the key. If the ID is found and identified as valid, Processor 312 requests a session block address from Server 600, and sends it to ERISC 302, which retrieves the corresponding Lock 300 password from RAM 304 and sends the session block address and Lock 300 password to remote Key 100, where they are received by ERISC 104.

ERISCs 104 and 302 compute the logical value of Addresses 120 and 320 respectively, by multiplying the session block address value times the number of bytes used for a complete session. Addresses 120 and 320 correspond to the start point within RAMs 102 and 304 for retrieval of passwords. ERISCs 104 and 302 control the incrementing of Addresses 120 and 320 respectively, to permit the reading of Data 122 and 322 from RAMs 102 and 304. Under no conditions, do ERISCs 104 or 302 allow the incrementing of Addresses 120 or 320 to advance beyond a value which would exceed the number of bytes used for a complete session. With control of this process by ERISCs 104 and 302, access of Data 122 and 322 from RAMs 102 and 304 is not permitted beyond the boundaries of a session block address. This functionality guards against the revealing of Data 122 or 322, which is stored beyond the boundary limits of a session address for RAMs 102 and 304.

After setting Address 120 as described above, ERISC 104 reads its copy of Lock 300 password from RAM 102, and ERISC 104 compares the password read from RAM 102 to the password received from Lock 300 to determine if they are equal. If comparison shows that they are not equal, the session is aborted, and ERISC 104 sends a command over Output 130 to inform the user, that the session attempt is aborted, because Lock 300 could not be verified as a valid lock. This process of verification for Lock 300 is a defense against an attack on Key 100, for the purpose of reading the secret passwords stored in RAM 102. In the event that Lock 300 is a dummy and a partner in an attempted attack on Key 100, nothing has been revealed by Key 100 except the Key 100 ID. If Key 100 verifies that Lock 300 is a valid lock, by ERISC 104 reading the stored password from RAM 102, comparing it to the password received from Lock 300, and determining that they are equal, then Key 100 responds by sending to Lock 300, the associated key password for this attempted session. If Key 100 password is equal to the stored value in RAM 304, cross validation of Key 100 and Lock 300 is accomplished and access is granted. If Key 100 password is not equal to the stored value in RAM 304, the access attempt is terminated by Lock 300.

Communication paths for Key 100, are provided by a capacitive interface coupling of signals to external devices, in order to prevent direct ohmic electrical contact to Key 100 circuitry. The capacitive interface is accomplished by bringing insulated metallic Plates 108–118 internal to Key 100, in close proximity to associated Plates 208–218 that are external to Key 100. Three signal paths are required for key communications: a Path 132 for input, a Path 130 for output, and a Path 134 to receive an external clock signal used to synchronize the proper time for signal transfer and for operation of ERISC 104.

Input and output communications are asynchronous and serial, requiring the use of a universal asynchronous receiver transmitter (UART) for communications control. The functions of a UART are performed by ERISCs 104, 302, and 402.

Each Lock 300 is identified by a unique Address 318 which is manually set with Lock 300 housing open. Address 318 is protected against a physical attack by sensors 308, which trigger an erase of RAMs 304 and 306 when Lock 300 housing is opened. Lock 300 guards against external electronic attack by employing two processors, ERISC 302 and a Micro Processor 312. ERISC 302 connects to the Public Switched Telephone Network (PSTN) through a Modem 314, and is designed to resist attempts, to reveal secret password data stored in RAM 304.

An optional means to prevent Key 100 ID substitution requires the use of a secret number, unique to each Key 100, and stored in RAMs 102 and 306, that is used to modify both the Key 100 and Lock 300 passwords during the cross verification process.

Each Key 100 is capable of supplying a unique encryption key for each session in which encryption/decryption is desired. Incorporated into each Key 100 is a means for constructing an encryption key from the passwords stored in RAM 102, according to a unique mapping pattern, and relative to a session block address. Each Lock 300 can construct the same said encryption key, since the specific Key 100 mapping pattern for encryption key construction is stored in RAM 306 with the Key 100 ID.

An optional Key 100 is capable of constructing unique composite Key 100 and Lock 300 passwords for a session. Incorporated into each optional Key 100 is a means for constructing Key 100 and Lock 300 passwords from the passwords stored in RAM 102, according to a unique mapping pattern, and relative to a session block address. An optional Lock 300 can construct the same said composite passwords, since the specific optional Key 100 mapping pattern for composite password construction is stored in RAM 306 with the optional Key 100 ID.

An optional Key 100 is capable of constructing a unique authentication word for a session. Incorporated into each optional Key 100 is a means for constructing an authentication word from the passwords stored in RAM 102, according to a unique mapping pattern, and relative to a session block address. An optional Lock 300 can construct the same authentication word, since the specific optional Key 100 mapping pattern for authentication word construction is stored in RAM 306 with the optional Key 100 ID. Each optional Key 100 uses a unique mapping pattern to select a key and lock password from the authentication word. An optional Lock 300 can select the same key and lock passwords from the authentication word because the specific optional Key 100 mapping pattern for key and lock password selection from the authentication word is stored in RAM 306 with the optional Key 100 ID. After access has been granted, the remaining authentication word is used to ensure authenticity and liveness of communications, by tagging each element of communication with an unused byte of the authentication word, according to a predetermined means. Authenticity and liveness are verified by comparing the byte of the authentication word used to tag an element of communication received to the byte of the authentication word expected.

The construction of composite passwords, encryption keys, and authentication words, follows a process that is unique and specific for each Key 100 within a system. This process further functions as a means of expanding the total available set of passwords stored, into a larger usable set of passwords and encryption keys.

Access Device Detailed Description

Figure 2:
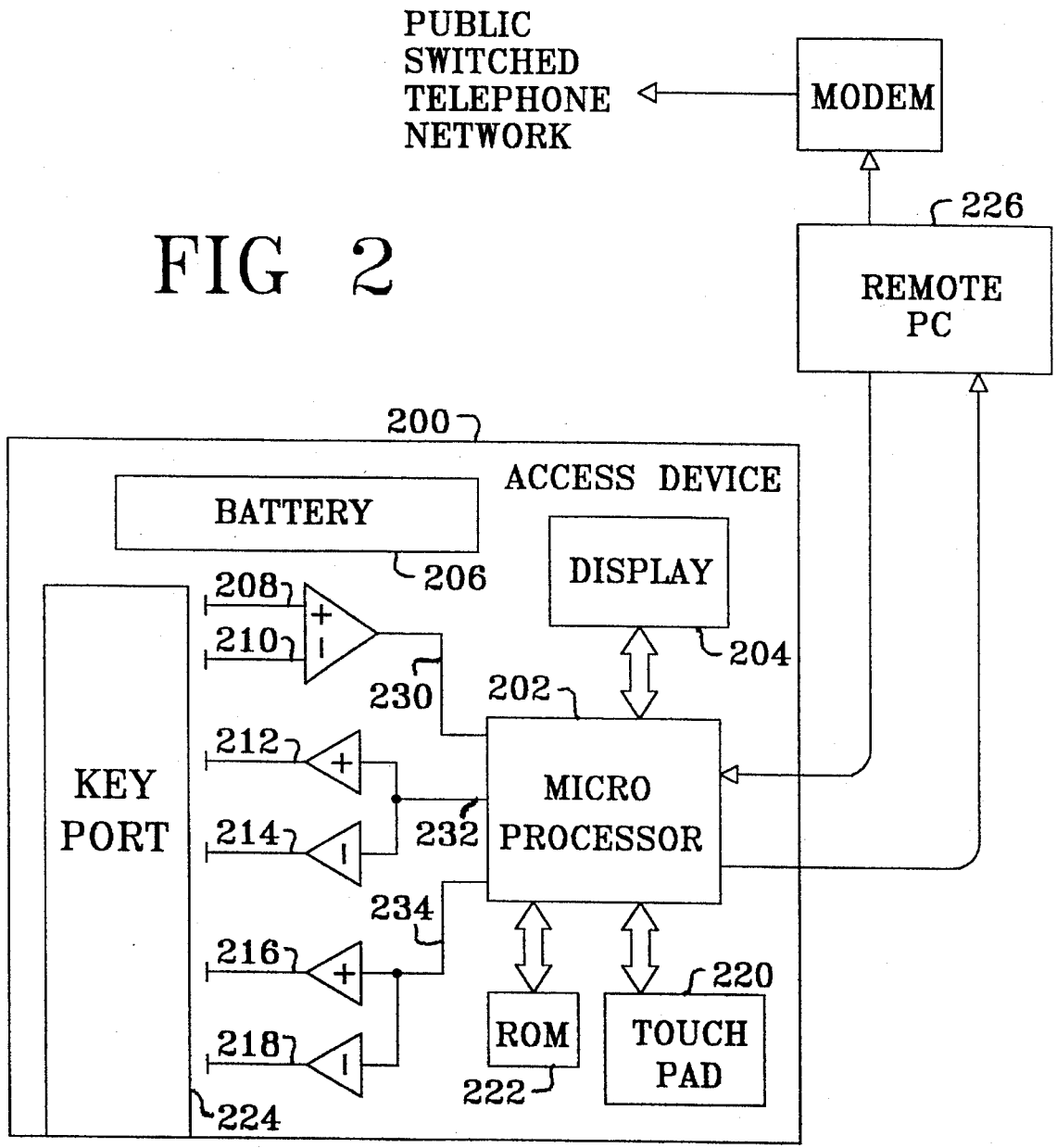
FIG. 2 is a block and line diagram of an access device used in connection with the key and lock of FIG. 1.

Referring now to FIG. 2, as relating to a remote access application, there is disclosed a block diagram of an Access Device 200. The function of Access Device 200 follows commands given by Key 100 and Lock 300. When Key 100 is inserted into a Key Port 224, capacitive plates 108–118 pair with capacitive plates 208–218 to establish communication pathways between Access Device 200 and Key 100. Once inserted into Key Port 224, Key 100 receives a Clock Signal 234 from Access Device 200, and a Display 204 instructs the user to enter touch-print. A Touch Pad 220 receives a touch-print, as the user presses a predetermined number of blank faced keys on Touch Pad 220, in a predetermined sequence. Access Device 200 passes the touch-print entered, to Key 100 for comparison, where 3 results are possible. In one possible situation, the touch-print entered by the user does not match with the stored value in RAM 102, and Key 100 sends an instruction to Micro Processor 202, which commands Display 204 to display a message for the user to try again. In a second possible scenario, the touch-print entered by the user does not match with the stored value in RAM 102, and ERISC 104 erases the contents of RAM 102, because the total number of tries allowed has been reached. In the third possible situation, the touch-print entered by the user matches with the stored value in RAM 102; Key 100 validates the user as authorized and switches to a communicative state.

Access Device 200 now receives Key 100 ID and passes it to a Remote PC 226, which calls up a host computer lock to request access. Access Device 200 receives Lock 300 password and session block address via Remote PC 226 and passes this information to Key 100. If the information received from Lock 300 does not match with information stored in RAM 102, Display 204 instructs the user that the access attempt has been terminated. If the information received from Lock 300 matches with information stored in RAM 102, Access Device 200 receives Key 100 password and passes it to Lock 300 via Remote PC 226. If Key 100 password does not match with information stored in an Access RAM 304, Display 204 instructs the user that the access attempt has been terminated. If Key 100 password matches with information stored in RAM 304, Display 204 instructs the user that access has been granted.

A Micro Processor 202 functions as a Universal Asynchronous Receiver Transmitter (UART) for communications to Key 100 and PC 226. A ROM 222 stores the program for the operation of Micro Processor 202. A battery 206 allows for portable use of Access Device 200.

Lock Server/Server Device Description

Figure 5:
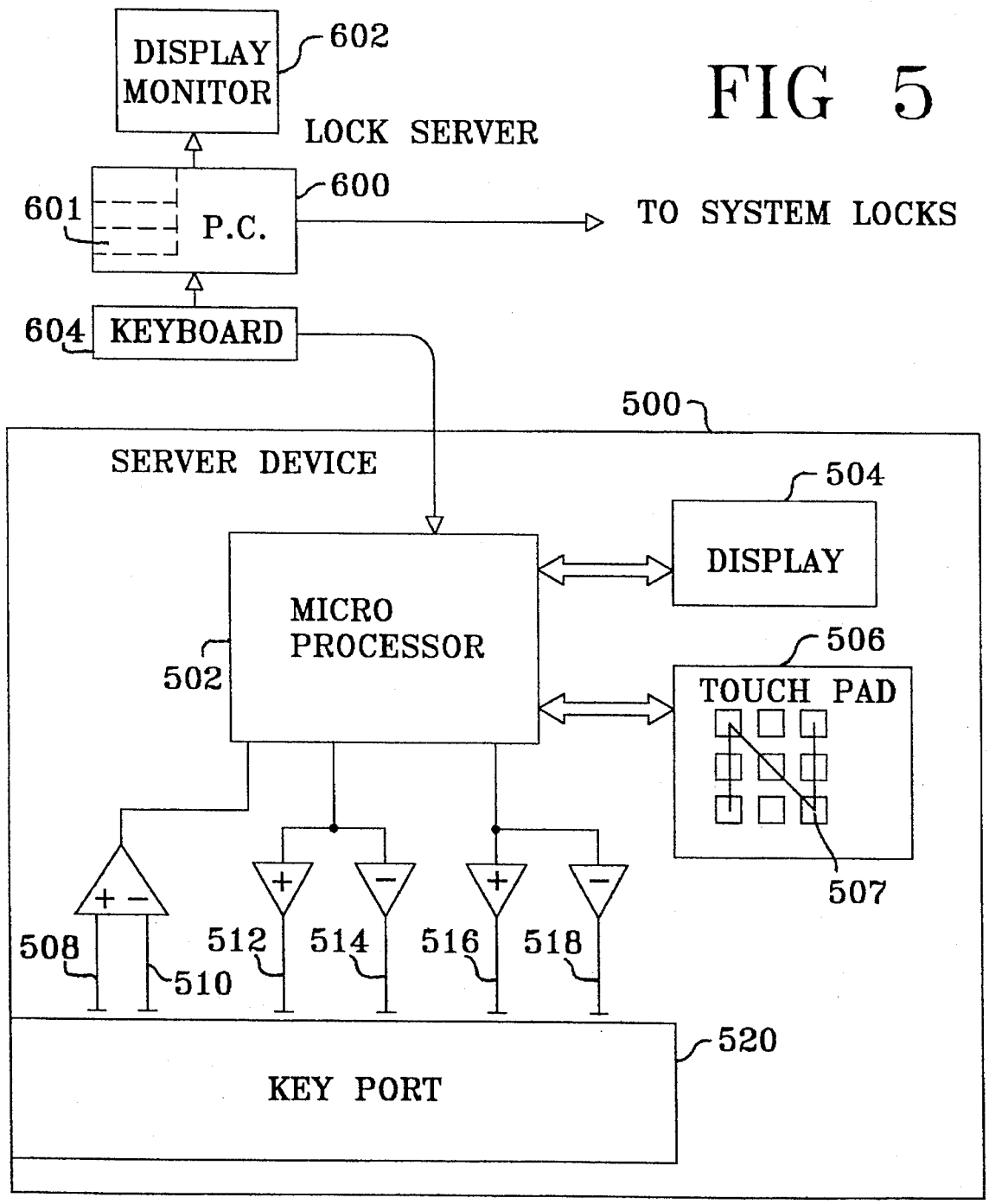
FIG. 5 is a block and line diagram of a lock server in accordance with the invention.

Referring to FIG. 5, there is disclosed a diagram of a Lock Server 600, and a Server Device 500. Server 600, which advantageously may comprise a personal computer, e.g. an IBM 486, performs the function of polling each Lock 300 in a network of locks, to verify that each Lock is operational and in place. Server 600 also controls the Lock 300 load process, updates Lock 300 information for the addition of new keys, invalidates keys that have been lost or stolen, loads Master Device 400, and serves requests from Lock 300 for session block addresses.

In the event that Lock 300 becomes inoperative, Server 600 displays information, to direct personnel to the malfunction or possible attack on a lock. In the event that access to Lock 300 is attempted by a stolen, lost, or expired Key 100, and the Key 100 is erased by command from Lock 300, Server 600 displays information for reference. Server 600 also monitors system activity, and stores a record of the time and date, Key ID, and Lock identity for each access, as well as separately noting where access was denied.

Server 600 is a repository for all information about Lock 300 locations, as well as Key 100 IDs, all key function parameters, touch-prints, and user identities. Server 600 is also a repository for the file of secret passwords that is stored in RAMs 102 and 304. This file is shown in dotted lines as memory segment 601 in server 600. The file is generated by two pseudo-random number generators which operate as software programs in Server 600, where each generator is initiated by independent random seeds. Random seeds are created in Server 600 by measuring the time spacing between keystrokes of a user entering data at a Keyboard 604. The first pseudo-random number generator creates secret Lock 300 and Key 100 passwords. The second pseudo-random number generator assigns address locations for the storage of each password created by the first pseudo-random number generator. This combination of 2 pseudo-random number generators creates a set of secret passwords that have little correlation of sequence, making it difficult to predict future passwords, given pseudo-random algorithms used, plus the history of all previous passwords. A second pair of pseudo-random number generators computes a set of numbers used to randomly assign session block addresses.

At the conclusion of the Lock loading process, Server 600 receives from Master Device 400, and stores, a report of all loading activity, including any event of an incomplete loading. When all Master Devices 400 have reported to Server 600, Server 600 restores the polling activity of those Locks 300 that have been reported by Master Devices 400 as loaded. Any duplicate loadings or attempts at duplicate loadings, or loading of any Lock 300 with Address 318 that is not recognized by Server 600, are all reported as security breaches.

Server Device 500 contains a Touch Pad 506, and a Key Port 520 for loading Key 100. A Key 100 to be issued is inserted into Key Port 520, and the identity of the Key 100 user is entered into Server 600 on Keyboard 604. The user enters a candidate touch-print on Touch Pad 506, which is read by Processor 502, and sent to Server 600, which searches its database to determine if the candidate touchprint entered is either assigned to another person, or reserved. If the candidate touch-print is unavailable, Server 600 instructs the user to enter another candidate touch-print. This process is repeated until one unique touch-print is entered by the user. Once a candidate touch-prim is determined to be acceptable by Server 600, Server 600 instructs the user is to enter the accepted touch-print for verification using Touch Pad 506.

After the accepted touch-print entry, Server 600 issues an ID for Key 100. After storing the Key 100 ID, the user touch-print, and the user identity in its database, Server 600 sends a reserved touchprint as a command to Processor 502 to erase RAM 102. Processor 502 sends the command to ERISC 104 which switches to the load state, and erases RAM 102. Server 600 sends a command plus the touch-print, Key 100 ID, and any key function parameters to Processor 502. Processor 502 sends a command plus the touch-print, Key 100 ID, and any key function parameters to ERISC 104, which stores the data in RAM 102. Server 600 reads its database to retrieve the secret password data, and sends a command plus the password data to Processor 502, which forwards the password data to Key 100, where it is received by ERISC 104, and stored into RAM 102.

Master Device Detailed Description

Figure 4:
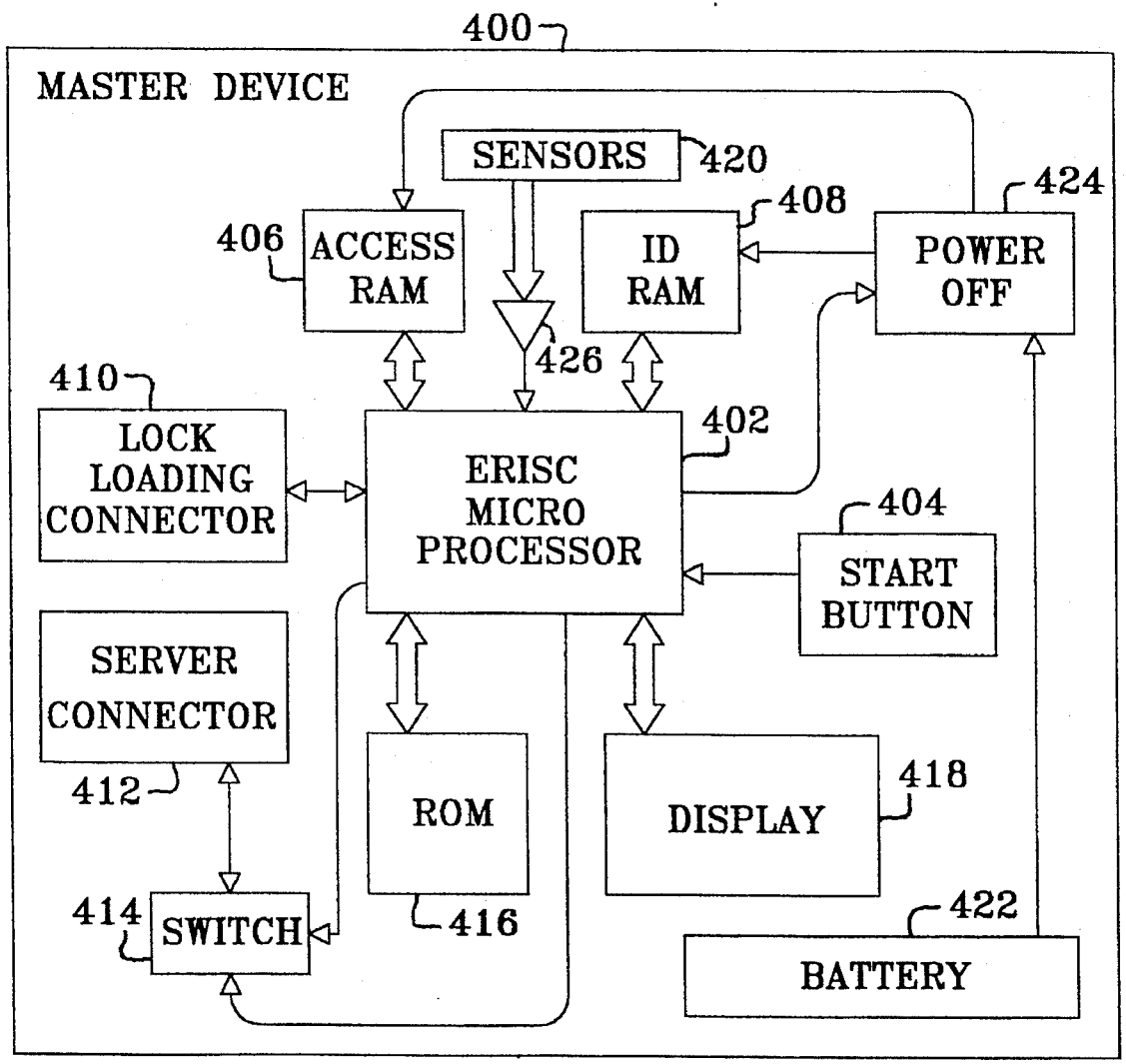
FIG. 4 is a block and line diagram showing a master device in accordance with the present invention.

Referring to FIG. 4, there is disclosed a diagram of a Master Device 400, whose function is to load Key IDs and all key function parameters, including secret password data, into Lock 300. Data is loaded into Master Device 400 by placing it adjacent to Server 600 and connecting it by means of a Server Connector 412. Server 600 sends a command to an ERISC Micro Processor 402 which erases a RAM 406. Server 600 reads its database to retrieve the passwords and sends a command with the data to ERISC 402, which stores the passwords into RAM 406. Next, Server 600 sends a command to ERISC 402, which erases a RAM 408. Server 600 reads its database of Key IDs and key function parameters and sends a command and the data to ERISC 402, which stores the data in RAM 408.

Master Device 400 loads the secret passwords, Key IDs and all key function parameters into Lock 300, by connecting a Lock Loading Connector 410 to a Load Port 316. The loading process begins, by actuating a Start Button 404. ERISC 402 sends a command to Lock 300 to begin the loading process. ERISC 312 reports Address 318 to ERISC 402 and notifies Server 600 that a request to load has been received. Server 600 grants permission to proceed with the loading process, removes Address 318 from the list of Locks being polled, and stores a record of the loading request. ERISC 312 sends a command to ERISC 302 to erase RAM 304 and load the data. ERISC 302 erases RAM 304, and then notifies ERISC 402 that it is ready for loading data. ERISC 402 reads passwords from RAM 406 and sends a command to load along with the passwords to ERISC 302. ERISC 302 loads the password data into RAM 304. ERISC 402 sends a command to ERISC 312 to erase RAM 306. ERISC 312 erases RAM 306 and notifies ERISC 402 that it is ready to load Key ID data. ERISC 402 reads the Key ID data from RAM 408 and sends a command to load data to ERISC 312. ERISC 312 loads Key ID data into RAM 306. When the loading is complete, Master Device 400 stores a record of the loading event. When Master Device 400 has loaded all Locks 300, it is returned to Server 600 to report all loading activity, and is then erased of all data. An array of sensors 420 protect Master Device 400 against a physical attack while active, by triggering ERISC 402 to erase RAMs 406 and 408 if Master Device 400 is opened.

Other Implementations

The implementation of the disclosed invention in a LAN, WAN, or Internet application would differ from a remote application, by requiring that only one lock be used to control all individual access requests; this one lock would additionally discard any communication from a source not authenticated.

Facility access applications prefer that the access device and lock be incorporated into one unit. When access is granted, a signal from the Lock triggers the action of a solenoid bolt, as is common in a number of door locks utilizing electronic control. The Lock Server would store a record of the time, Key ID, and Lock identity for each access, as well as separately noting where access was denied.

Although various particular embodiments have been disclosed or suggested, it is clear that others are possible within the spirit and scope of the invention. Further modifications and variations of the present invention are possible and include but are not limited to what has previously been described. For applications relating to cellular communications or remote financial transactions, individual system components may be combined, simplified, or in some cases entirely eliminated.

What is claimed is:

1. A security device for a computer system, comprising:
   A. a key having means for storing security codes therein in at least first and second locations;
   B. means for communicating with a host computer lock for initiating the transmission to said key of a session address and a lock password;
   C. means associated with said key for comparing said session address and said lock password with a lock password stored in said key and the location given by said session address;
   D. means in said key responsive to matching said session address and said lock password for retrieving a key password and transmitting it to said host lock;
   E. means at said host lock for comparing said second password and the location at which it is stored in said key with corresponding information in said lock and granting or denying access to the host based on the presence or absence of a match.

2. Apparatus for providing security in a computer system, comprising:
   A. means for generating random identification numbers for providing access identification to a user;
   B. means for generating random addresses in which said identification numbers are to be stored;
   C. host computer protection means having an addressable memory for storing said identification numbers at said addresses;
   D. security key means having an addressable memory for storing said identification numbers at said addresses;
   E. means for transmitting between said protection means and said key means an identification number and an address associated with the number in connection with a request for access to the host computer; and
   F. means for comparing said identification number and said address and denying access when the two are not the same.

* * * * *